G. M. RICHARDS.
FLUID ACTUATED CONTROLLING DEVICE.
APPLICATION FILED JAN. 8, 1916.

1,286,781.

Patented Dec. 3, 1918.
2 SHEETS—SHEET 1.

Inventor
George M. Richards.
by Wilhelm & Parker
Attorneys.

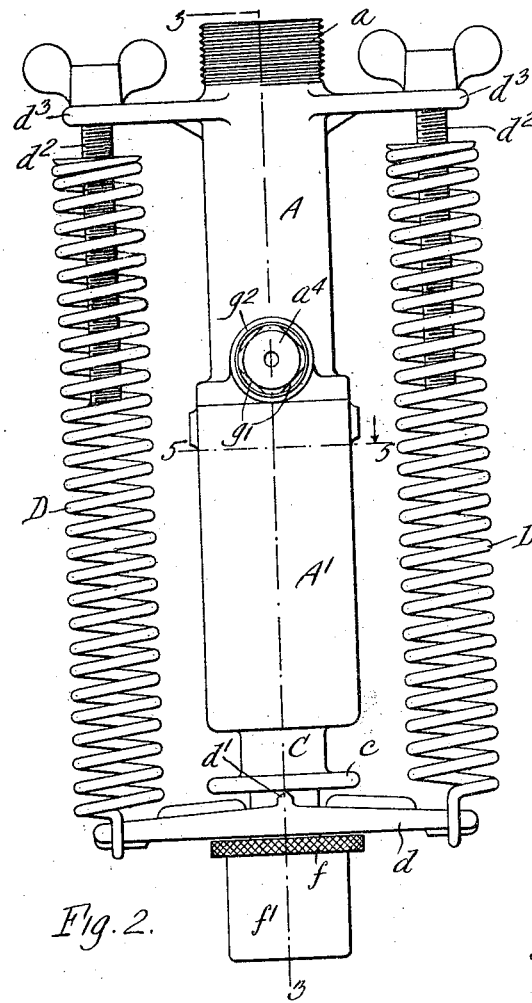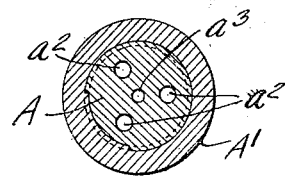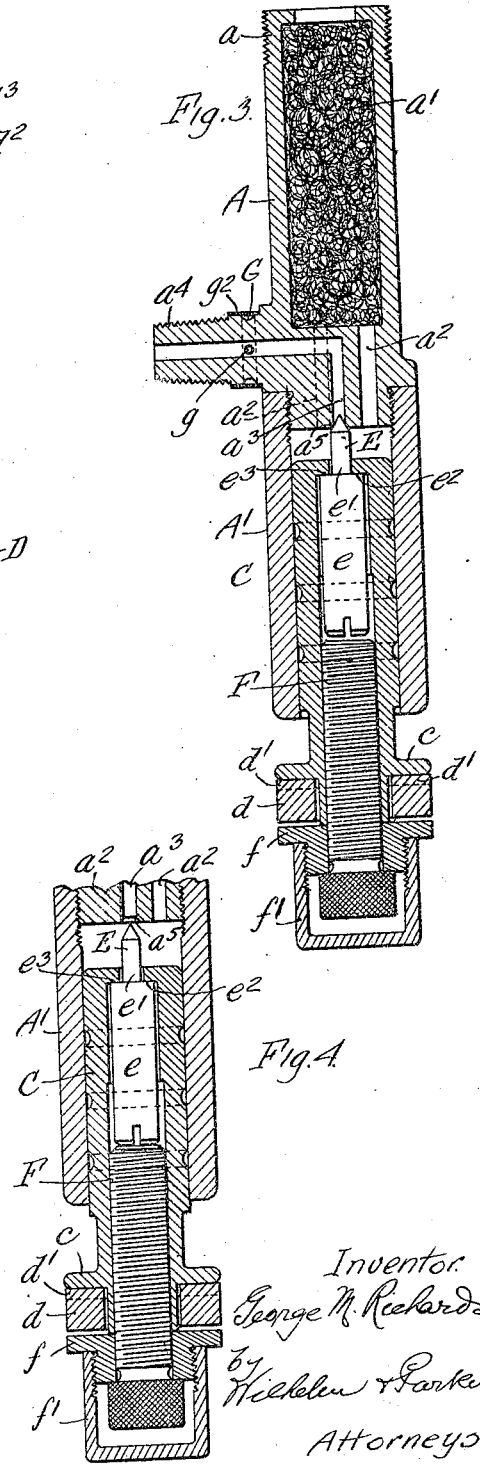

UNITED STATES PATENT OFFICE.

GEORGE M. RICHARDS, OF PHILADELPHIA, PENNSYLVANIA.

FLUID-ACTUATED CONTROLLING DEVICE.

1,286,781.

Specification of Letters Patent.

Patented Dec. 3, 1918.

Application filed January 8, 1916. Serial No. 70,981.

*To all whom it may concern:*

Be it known that I, GEORGE M. RICHARDS, a citizen of the United States, residing at Philadelphia, in the county of Philadelphia and State of Pennsylvania, have invented a new and useful Improvement in Fluid-Actuated Controlling Devices, of which the following is a specification.

This invention relates to controlling devices of the kind which are actuated by fluid pressure and which are employed in connection with the regulation of fluid pressure.

The objects of the invention are to provide a device of this kind of improved and simplified construction which can be used in connection with other apparatus, such, for example, as governors, controllers, or unloaders of air compressors, to effect the regulation of the fluid pressure, and which is adjustable to vary the maximum and minimum pressure of the fluid as desired; also to improve the construction of devices of this kind in the respects hereinafter specified.

In the accompanying drawings:

Fig. 2 is an elevation, on an enlarged scale, of a controlling device embodying the invention.

Fig. 3 is a central sectional elevation thereof on line 3—3, Fig. 2.

Fig. 4 is a similar fragmentary elevation thereof showing some of the parts of the device in different positions.

Fig. 5 is a horizontal section thereof on line 5—5, Fig. 2.

Figure 1:
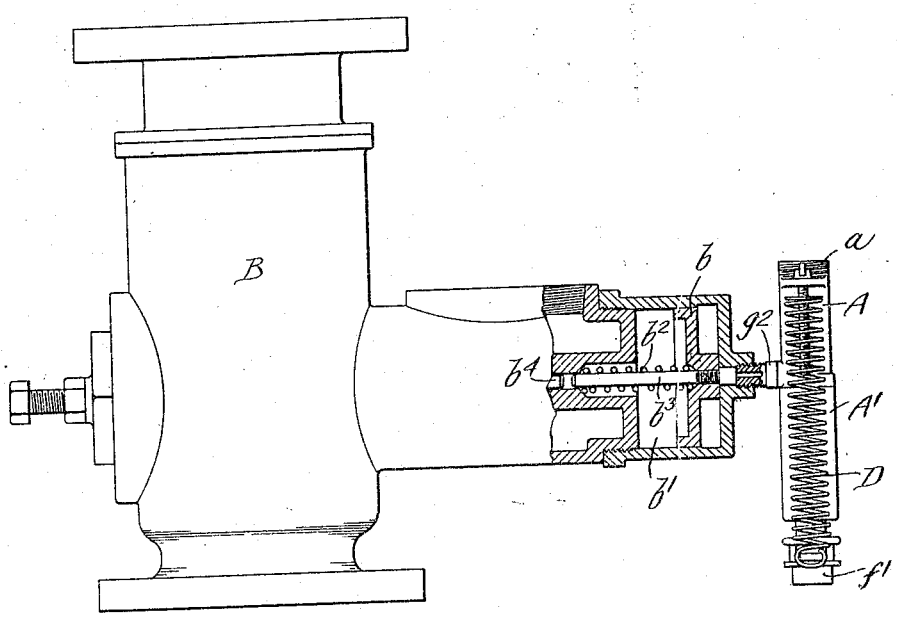
Figure 1 is an elevation, partly in section, of an unloader having a controlling device embodying the invention connected therewith.

The controlling device is primarily intended for use in connection with air compressors for maintaining the pressure in the receiver between desired maximum and minimum pressures, and the word "air" is hereinafter used to designate the fluid of which the pressure is to be regulated, and it is not intended thereby to limit the use of the device to air compressors or pumps. The device is used in connection with one or more regulating or load changing means effecting the supply of compressed air to the receiver, such as an unloader which is adapted to interrupt the supply of air to the receiver, or an electric controller for regulating the speed or stopping the driving motor in the case of electrically operated compressors, or a steam governor in the case of a steam driven compressor, or any other means by which the supply of air to the receiver may be interrupted or varied. The controlling device may, for example, as is shown in Fig. 1, be used in connection with the unloader shown in my copending application 721,730, filed September 23, 1912.

The housing or casing of the controlling device may be of any suitable construction, that shown in the drawings consisting of a part A, the upper end $a$ of which is adapted to be connected with a receiver or container (not shown) for the compressed air, and a cylinder A' which is secured to the upper part A of the housing. Air from the receiver, after entering the housing at $a$, passes through a chamber $a'$ containing filtering material which prevents the passage of dirt or grit, which may be contained in the compressed air, to the mechanism of the controlling device, and enters the cylinder A' through passages $a^2$, three passages being shown in the construction illustrated. The air may be discharged from the cylinder through a passage $a^3$ formed in the part A of the housing and terminating at one end in a nipple $a^4$ which may be connected with suitable regulating means actuated by compressed air for interrupting or reducing the supply of compressed air to the receiver, such as an unloader B, Fig. 1. The unloader B is of the discharge or pressure type as shown in my application 721,730, above referred to, and has the usual unloading valve (not shown) which, when the compressor is to be unloaded, is opened by means of a piston $b$ arranged in a cylinder $b'$ which is connected with the discharge passage $a^3$ of the controlling device. The piston is normally held in a position near the head of the cylinder by means of a spring $b^2$. When compressed air is admitted to the cylinder $b'$, the piston is moved against the action of the spring and presses a piston rod $b^3$ against a slidable rod $b^4$ which opens the unloader valve. Other means may be employed for actuating the unloader, and such actuating means may be used in connection with a governor, electric controller, or other means for interrupting the supply of compressed air to the receiver.

The inlet end of the passage $a^3$ terminates in a valve seat $a^5$ with which a valve cooperates for automatically controlling the flow of compressed air through the passage $a^2$. The air passages in the housing of the controlling device may be arranged in any other suitable manner.

The valve for controlling the flow of air in the passage $a^3$ may be actuated by any suitable motor affected by the pressure of air in the receiver, a piston C being employed for this purpose in the construction shown, which is arranged in the cylinder or housing A. The cylinder A' is open at its lower end and is adapted to receive a piston C which extends out of the open end of the cylinder. The outward movement of the piston by the pressure of the air is opposed by an adjustable resistance device, which may be of any suitable construction, that shown consisting of two springs D connected at one end thereof with a yoke $d$ which is preferably provided with a knife edge $d'$ bearing on a flange $c$ of the piston. The other ends of the springs are connected by tensioning screws $d^2$ to arms $d^3$ on the housing of the device.

E represents a valve which is mounted on the piston and which is held on the valve seat $a^5$ by the action of the springs D to close the passage $a^3$ as long as the pressure of the air in the receiver is below the maximum desired pressure, and which is moved to admit compressed air into the passage $a^3$ when the pressure of the compressed air is sufficient to move the piston C outwardly against the action of the springs D. In the construction shown, the piston C is made hollow and the valve E has an enlarged stem or body portion $e$ which is confined within the hollow piston, and a reduced part $e'$ forming an annular shoulder $e^2$ with the body portion of the valve. The reduced part $e'$ extends through a hole in the end of the piston which, being smaller than the inner bore of the hollow piston, forms an annular shoulder $e^3$ in the piston. The valve E fits loosely into the hollow piston, which enables the valve to center itself on the seat $a^5$ independently of the piston. The valve is also adapted to move endwise relatively to the piston and the extent of this lost motion is preferably adjustable. For this purpose an adjusting screw or plug F is secured in the hollow piston and is adjustable toward or from the shoulder $e^3$ of the piston. The movement of the valve relatively to the piston is limited in one direction by the shoulder $e^3$ of the piston and in the other direction by the end of the adjusting screw. When the piston moves in a direction to place the valve on its seat, the valve rests on the end of the adjusting screw, and when the piston moves in the opposite direction, the shoulders $e^3$ of the piston engage the shoulder $e^2$ of the valve and withdraw the valve from its seat.

$f$ represents a lock or jamb nut adapted to be screwed against the end of the piston for holding the adjusting screw in the position in which it is set. The lock nut engaging the end of the piston forms with the piston a tight joint to prevent the escape of air between the threads of the adjusting screw and the piston, and the escape of air between the threads of the adjusting screw and the lock nut is prevented by means of a screw lock nut or bonnet $f'$ which is secured on the lock nut and makes a tight joint therewith so that the escape of air at either side of the lock nut is prevented.

It is necessary to provide in the passage $a^3$ a bleeder port or other means for permitting air to escape from the passage $a^3$ when the valve E is seated, so that the pressure in the passage $a^3$ will be reduced. For this purpose a groove G is formed peripherally about the nipple $a^4$ and a hole $g$ connects the groove with the passage $a^3$. The peripheral portion of the nipple is then slightly flattened at one or more parts thereof, for instance by filing a small flat face thereon, as indicated at $g'$ on an exaggerated scale, and a band $g^2$ is secured about the nipple, covering the groove G. The air will then pass out of the passage $a^3$ through the hole $g$, the groove G and through the flattened portion $g'$ of the periphery. By means of this construction the size of the bleeder port can be controlled very precisely by the extent to which the periphery of the nipple is flattened at $g'$, so that the port can be made very small, if desired.

In the operation of the device, when the pressure in the receiver is below the maximum desired pressure, the piston C and the valve E supported thereby are moved by the springs D into position to seat the valve and prevent the discharge of compressed air through the passage $a^5$. As the pressure in the receiver increases, the piston C is moved outwardly with regard to the cylinder B and the valve E is held against its seat by the difference in pressure in the cylinder B and in the passage $a^3$. When the pressure in the receiver reaches the maximum for which the device is set, the shoulder $e^2$ of the piston C will engage the shoulder $e^2$ of the valve E and withdraw the valve from the seat $a^5$. The compressed air then enters the passage $a^3$ and acts on the piston $b$ of the actuating device of an unloader, governor or the like to interrupt or decrease the supply of compressed air to the receiver.

The valve then drops by gravity on the end of the adjusting screw F and consequently occupies a lower position relatively to the piston than it did at the time it was withdrawn from the seat. Consequently when the pressure in the receiver falls below the maximum and the piston C is again moved upwardly, the valve E will not be seated until the piston has moved inwardly a distance equal to the lost motion between the valve and the piston, so that the supply of air to the receiver is not begun until after the pressure has dropped somewhat below the maximum. By regulating the position of the adjusting screw the difference between the receiver pressure necessary to unseat the valve E and the pressure at which the valve is again seated can be regulated as desired, so that the controlling device is adaptable to fluid compressors working under a variety of different conditions. When the valve E is seated, the compressed air in the passage $a^3$ passes out through the bleeder passage in the nipple $a^4$, thus permitting the piston $b$ of the actuating device of the unloader or governor to return to its initial position, so that the supply of air to the receiver is resumed.

I claim as my invention:

1. In a controlling device for an unloader, governor or the like, the combination of a housing connected with a supply of fluid, the pressure of which is to be controlled, a discharge passage for the fluid, a motor in said housing affected by changes in fluid pressure, a valve controlling said discharge passage and movably connected with said motor, said valve when open normally occupying a position as far from said passage as is permitted by the relative movement between said valve and motor, and adjustable means for limiting the movement of said valve relatively to said motor for regulating the operation of said device.

2. In a controlling device for an unloader, governor or the like apparatus, the combination of a housing connected to a supply of fluid, the pressure of which is to be controlled, a discharge passage for the fluid, a motor in said housing affected by changes in fluid pressure, a valve controlling said discharge passage, a lost motion connection between said valve and said motor to cause the motor to actuate said valve, said valve being held at one end of said lost motion connection when said valve is being closed, and at the other end of said lost motion connection when the valve is being opened, and means for adjusting the relative movement between said valve and said motor to regulate the operation of said device.

3. In a controlling device for an unloader, governor or the like, the combination of a housing connected with a supply of fluid, the pressure of which is to be controlled, a discharge passage for the fluid, a motor in said housing affected by changes in fluid pressure and arranged below said passage, a valve mounted on said motor below said passage and movable vertically relatively to said motor, said valve being held by gravity in its lowest position relatively to said motor before said valve closes said passage and being held by pressure in its upper position relatively to said motor when said motor draws said valve out of engagement with said passage, and means for adjusting the extent of relative movement between said motor and said valve.

4. In a controlling device of an unloader, governor or the like apparatus, the combination of a casing connected with the supply of fluid under pressure and having a discharge passage for the fluid connected with said apparatus, a cylinder, a piston in said cylinder adapted to be moved in one direction by the fluid, means for yieldingly opposing the movement of the piston by the fluid, a valve carried by said piston and actuated when the piston is moved by the compressed fluid to open said discharge passage, and to close the discharge passage when the piston is moved in the reverse direction, for causing said apparatus to effect a variation in the fluid pressure, said valve being movable relatively to said piston and being arranged to occupy a position at one end of its movement relatively to said piston when closing said discharge passage and to occupy a position at the other end of its movement when said discharge passage is opened, and adjustable means for limiting the extent of the movement of the valve relatively to said piston.

5. The combination of a cylinder connected with a supply of fluid, the pressure of which is to be controlled, a discharge passage for the fluid, a hollow piston in said cylinder, a valve controlling said discharge passage and having a stem arranged in said hollow piston and movable relatively to said piston, and a plug adjustable in said piston to limit the movement of said valve.

6. The combination of a cylinder connected with a supply of fluid, the pressure of which is to be controlled, a discharge passage for the fluid, a hollow piston arranged in said cylinder, and a valve having a part arranged within said piston and a part extending out of the piston for controlling said discharge opening, said valve being movable relatively to said piston, and an adjusting screw secured in said piston and adjustable to limit the movement of the valve relatively to said piston.

7. The combination of a cylinder connected with a supply of fluid, the pressure of which is to be controlled, a discharge passage for the fluid, a hollow piston arranged in said cylinder, and a valve having a part arranged within said piston and a part extending out of the piston for controlling said discharge opening, said valve being movable relatively to said piston, an adjusting screw secured in said piston and adjustable to limit the movement of the valve relatively to said piston, and a lock nut engaging said adjusting screw and said piston.

8. The combination of a cylinder connected with a supply of fluid, the pressure of which is to be controlled, a discharge passage for the fluid, a hollow piston arranged in said cylinder, and a valve having a part arranged within said piston and a part extending out of the piston for controlling said discharge opening, said valve being movable relatively to said piston, an adjusting screw secured in said piston and adjustable to limit the movement of the valve relatively to said piston, a lock nut engaging said adjusting screw and said piston, and a cap secured to said lock nut and inclosing the end of said adjusting screw which projects out of the piston.

9. In a controlling device, the combination of a casing adapted to be connected with a supply of fluid, the pressure of which is to be controlled, and having a cylinder and a discharge passage for compressed fluid, a piston-actuated valve controlling said discharge passage, a tubular part in which said discharge passage is formed, and a bleeder port in said discharge passage comprising a hole extending from the outer periphery in said tubular part to said passage, a band extending around said tubular part and over said hole, and a notch between said band and said tubular part through which air can escape from said hole.

10. In a controlling device, the combination of a casing adapted to be connected with a supply of fluid, the pressure of which is to be controlled, and having a cylinder and a discharge passage for compressed fluid, a piston-actuated valve controlling said discharge passage, a tubular part in which said discharge passage is formed, and a bleeder port in said discharge passage comprising an annular groove formed on the periphery of said tubular part, a hole connecting said groove with said passage, a band secured to said tubular part and covering said groove, and a passage between said band and said tubular part which is formed by a depression in the periphery of said tubular part through which compressed air may escape from said passage.

Witness my hand this 28th day of December, 1915.

GEORGE M. RICHARDS.

Witnesses:
MARION A. RICHARDS,
HERBERT E. HOSBACT.

Copies of this patent may be obtained for five cents each, by addressing the "Commissioner of Patents, Washington, D. C."